(12) United States Patent
Taguchi et al.

(10) Patent No.: US 7,965,339 B2
(45) Date of Patent: Jun. 21, 2011

(54) RESOLUTION ENHANCING METHOD AND APPARATUS OF VIDEO

(75) Inventors: Yasunori Taguchi, Kawasaki (JP); Takashi Ida, Kawasaki (JP); Toshimitsu Kaneko, Kawasaki (JP); Nobuyuki Matsumoto, Inagi (JP); Takeshi Mita, Yokohama (JP); Hidenori Takeshima, Ebina (JP); Kenzo Isogawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1114 days.

(21) Appl. No.: 11/677,719

(22) Filed: Feb. 22, 2007

(65) Prior Publication Data

US 2007/0237416 A1 Oct. 11, 2007

(30) Foreign Application Priority Data

Apr. 11, 2006 (JP) .................................. 2006-108941

(51) Int. Cl.
*H04N 5/14* (2006.01)
(52) U.S. Cl. .......................... 348/575; 348/581; 348/625
(58) Field of Classification Search .................. 348/581, 348/625, 561, 571, 575; 382/298–300, 266–269; 345/671, 672
See application file for complete search history.

(56) References Cited

U.S. PATENT DOCUMENTS

| | | | |
|---|---|---|---|
| 6,055,335 A | 4/2000 | Ida et al. | |
| 6,275,615 B1 | 8/2001 | Ida et al. | |
| 6,380,934 B1 * | 4/2002 | Freeman et al. | 345/419 |
| 6,766,067 B2 | 7/2004 | Freeman et al. | |

FOREIGN PATENT DOCUMENTS

| | | |
|---|---|---|
| JP | 2003-18398 | 1/2003 |
| WO | WO 2005/067294 A1 | 7/2005 |

OTHER PUBLICATIONS

U.S. Appl. No. 11/461,662, filed Aug. 1, 2006, Nobuyuki Matsumoto, et al.
U.S. Appl. No. 11/558,219, filed Nov. 9, 2006, Ida et al.
U.S. Appl. No. 12/397,747, filed Mar. 4, 2009, Matsumoto, et al.
U.S. Appl. No. 11/695,820, filed Apr. 3, 2007, Taguchi, et al.
U.S. Appl. No. 11/828,397, filed Jul. 26, 2007, Matsumoto, et al.
U.S. Appl. No. 12/234,164, filed Sep. 19, 2008, Takeshima, et al.
U.S. Appl. No. 12/233,097, filed Sep. 18, 2008, Ono, et al.
U.S. Appl. No. 12/233,030, filed Sep. 18, 2008, Takeshima, et al.

* cited by examiner

*Primary Examiner* — M. Lee
(74) *Attorney, Agent, or Firm* — Oblon, Spivak, McClelland, Maier & Neustadt, L.L.P.

(57) ABSTRACT

A resolution enhancing method of a video includes reducing a training video, extracting a high-frequency component from the training video, calculating a first feature vector including a feature amount of a first spatio-temporal box in the reduced video, storing pairs of the first feature vectors and second spatio-temporal boxes in the high-frequency component videos at the same positions as those of the first spatio-temporal boxes, expanding an input video, retrieving a first feature vector similar to a second feature vector including a feature amount of a third spatio-temporal box of an object of the input video to be processed, as an element, and adding a second spatio-temporal box making a pair with the retrieved first feature vector to a fourth spatio-temporal box in the expanded video at the same position as that of the third spatio-temporal box in order to generate an output video.

17 Claims, 5 Drawing Sheets

RESOLUTION ENHANCING METHOD AND APPARATUS OF VIDEO

CROSS-REFERENCE TO RELATED APPLICATIONS

This application is based upon and claims the benefit of priority from prior Japanese Patent Application No. 2006-108941, filed Apr. 11, 2006, the entire contents of which are incorporated herein by reference.

BACKGROUND OF THE INVENTION

1. Field of the Invention

The present invention relates to a resolution enhancing method and apparatus for magnifying a video in at least one of a vertical direction, horizontal direction or time direction.

2. Description of the Related Art

One example of a resolution enhancing method for performing resolution enhancement on an image having a low resolution is disclosed by JP-A 2003-18398 (KOKAI). The method in the JP-A 2003-18398 (KOKAI) includes a training stage and a resolution enhancing stage. The training stage generates high-frequency component images of a training image as well as a reduced image obtained by reducing the training image in size. The training stage stores, as a look-up table, a plurality of pairs each composed of a feature vector of a block (reduced block) in the reduced image and a block (high-frequency block) in the high-frequency component image which is located at the same position as that of the reduced block (a part with the same object as the reduced block). The training stage shifts the positions of the reduced blocks to repeat the similar processing, appropriately adds the training images to repeat the foregoing processing, and then, terminates the processing.

On the other hand, the resolution enhancing stage calculates feature vectors of blocks in the input image (input blocks) as well as generates a temporary magnified image in which the input image to be enhanced in resolution is magnified. In this case, the input blocks are the same in size as those of the reduced blocks, and the feature vectors of the input blocks are calculated in the same method of the training stage.

Subsequently, the resolution enhancing stage retrieves the feature vector of the reduced block similar to the feature vector of the input block from the look-up table. The high-frequency block making a pair with the retrieved feature vector is added to the block in the temporary magnified image at the same position (temporary magnified block) to produce an output block. The temporary magnified block has the same size as that of the high-frequency block added to the temporary magnified block, and the output block is part of an output image. If the output blocks do not cover the whole of the output image, the resolution enhancing stage sifts the positions of the input blocks so as to cover the output image to repeat the same processing, and if the output blocks cover the whole thereof, the processing is terminated.

According to the method in such JP-A 2003-18398 (KOKAI), texture having become sharp as a result of the addition of the high-frequency component to the temporary magnified image for each block, the method therein can provide a sharp and high resolution image.

Reproducing, as a video, a plurality of resolution enhancing images obtained by applying the method in the JP-A 2003-18398 (KOKAI) to each frame of the video causes a time change in color at the same positions in a space direction sometimes. For example, it is presumed that the output block of a first output image in which a resolution of a t-th frame is enhanced is at the same position as that of a second output image in which a resolution of a (t+1)-th frame is enhanced in the space direction. At this point, in the training stage, the output blocks are high-frequency blocks in different two high-frequency component images, and in some cases, they are generated from positions absolutely different in space. The two high-frequency blocks have high-frequency components not continuous in the time direction as elements. Therefore, reproducing the first and second output image as the video each including the output blocks which are obtained by adding to the temporary magnified blocks causes unnatural time changes.

Such a situation, in which the blocks which are added to the same position in the space direction in succession in the time direction in the resolution enhancing stage are generated with one another from quite different positions in the training stage, occurs very frequently so far as the feature vector of the block at the same position as that of the block in the input image of the t-th frame is not perfectly identical with the feature vector of the block at the same position as that of the input image of the (t+1)-th frame. Accordingly, the reproduction of a plurality of resolution enhancing images obtained by applying the method disclosed in the JP-A 2003-18398 (KOKAI) to each frame of the video results in generating flickering with high frequency.

BRIEF SUMMARY OF THE INVENTION

According an aspect of the invention, there is provided a method of enhancing resolution of video, comprising: reducing at least one training video having a high-frequency component by a specified reduction ratio in at least one direction of a vertical direction and a horizontal direction to generate a reduced video having at least one first spatio-temporal box; extracting the high-frequency component from the training video to generate a high-frequency component video having at least one second spatio-temporal box; calculating at least one first feature vector including a feature amount of the first spatio-temporal box of the reduced video; storing, in a look-up table, a plurality of pairs each having the first feature vector and the second spatio-temporal box at a position equivalent to that of the first spatio-temporal box; magnifying an input video including a third spatio-temporal box by an magnification ratio of an inverse number of the reduction ratio in at least one direction of the vertical direction and the horizontal direction to generate a temporary magnified video having a fourth spatio-temporal box; retrieving, a first feature vector similar to a second feature vector including a feature amount of the third spatio-temporal box of the input video, as an element, from the look-up table; and adding the second spatio-temporal box stored in the look-up table, corresponding to the retrieved first feature vector, to the fourth spatio-temporal box at the same position as that of the third spatio-temporal box to generate an resolution-enhanced video.

DETAILED DESCRIPTION OF THE INVENTION

Embodiments of the present invention will be described while referring to the drawings hereinafter. In this case, the case will be described as an example, wherein the embodiment generates an output video in which an input video composed of a plurality of frames is magnified longitudinally and laterally (in vertical and horizontal) twice, respectively, in a space direction. An magnification ratio is not necessary to be an integer. The embodiment can magnify the input video in a time direction; namely, also can increase the number of frames of the output video more than that of the input video. Further, magnification ratios may differ in a vertical direction, a horizontal direction, and a time direction from one another. In the following description, an image signal or image data will be simply referred to as an "image".

Figure 1:
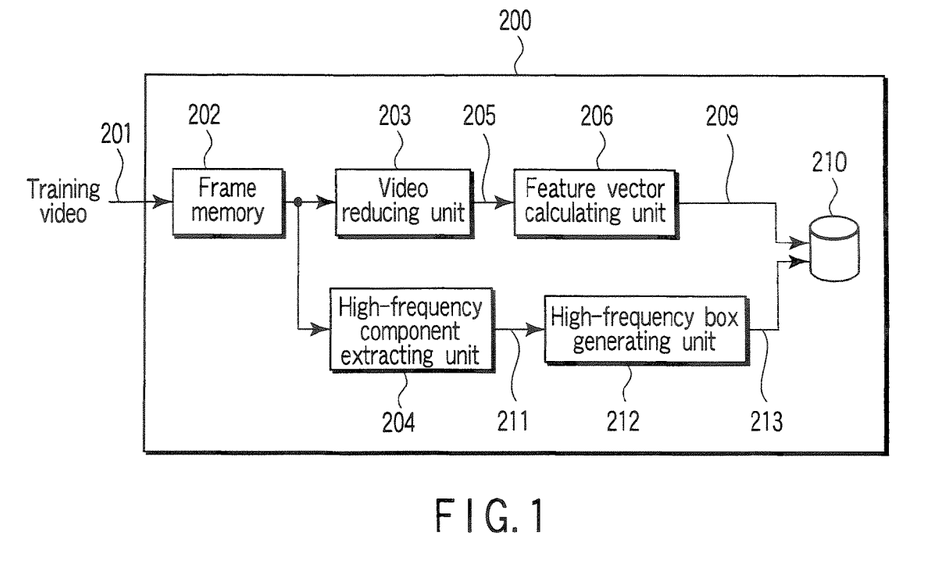
FIG. 1 is an exemplary block diagram illustrating a configuration of a training unit in an apparatus for attaining resolution enhancement of a video in accordance with one embodiment.

A resolution enhancing apparatus regarding the present embodiment comprises a training unit and a resolution enhancing unit 300. As shown in FIG. 1, the training unit 200 includes a frame memory 202 which temporarily stores a training video 201, a video reducing unit 203 and a high-frequency component extracting unit 204, which are connected to the output of the frame memory 202, a feature vector calculating unit 206 connected to the output of the video reducing unit 203, a high-frequency box generating unit 212 connected to the high-frequency component extracting unit 204, and a storage unit 210 connected to the outputs of the feature vector calculating unit 206 and high-frequency box generating unit 212, and storing a look-up table.

Figure 2:
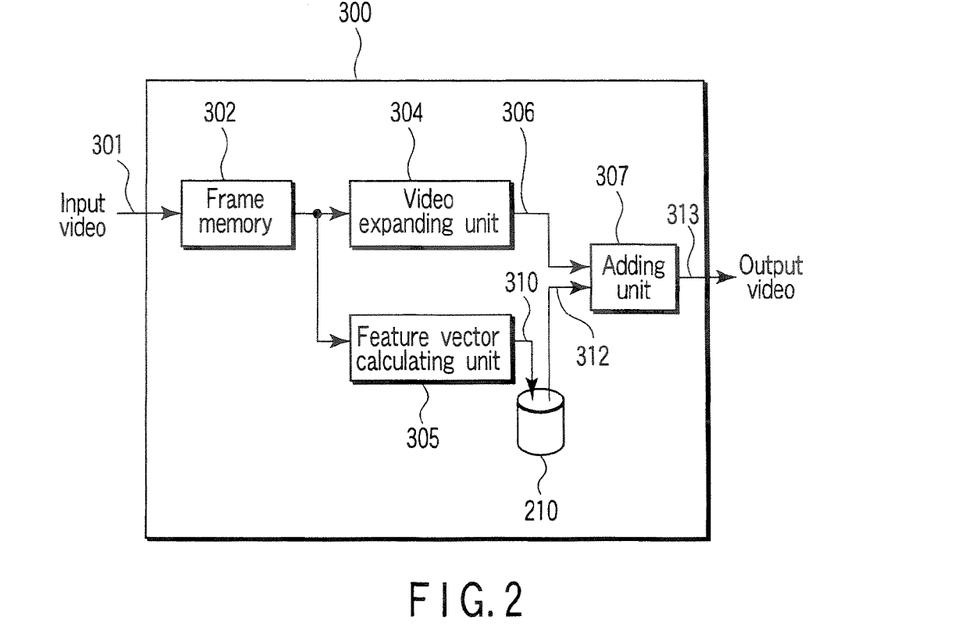
FIG. 2 is an exemplary block diagram illustrating a configuration of a resolution enhancing unit in the apparatus of the embodiment.

On the other hand, the resolution enhancing unit 300, as shown in FIG. 2, comprises a frame memory 302 which temporarily stores an input video 301 of an object to be resolution-enhanced, a video magnifying unit 304 and a feature vector calculating unit 305, which are connected to the output of the frame memory 302, and an adding unit 307 connected to the outputs of the video magnifying unit 304 and feature vector calculating unit 305. The storage unit 210 is shared between the training unit 200 and the resolution enhancing unit 300. The training unit 200 stores a look-up table into the storage unit 210 and the resolution enhancing unit 300 refers to the look-up table stored in the storage unit 210.

Figure 3:
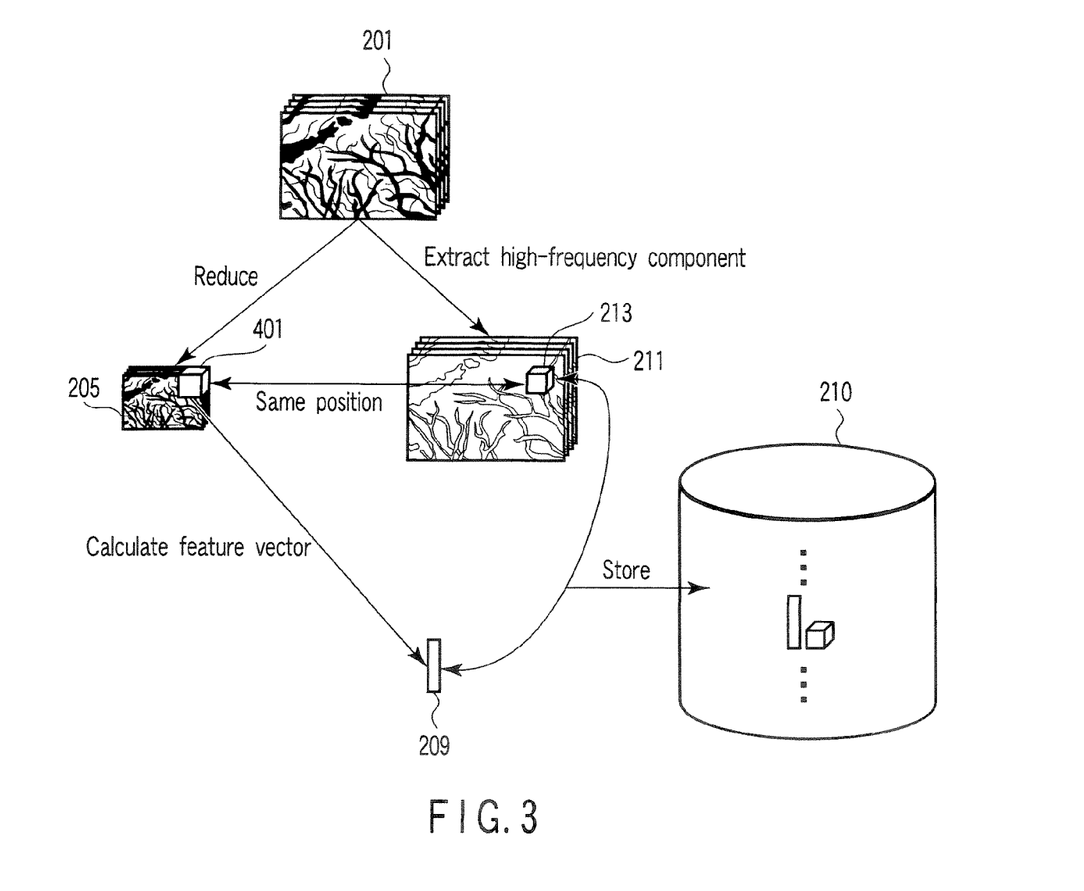
FIG. 3 is an exemplary schematic diagram for explaining processing of a training stage in the embodiment.

At first, the training unit 200 of FIG. 1 will be described in detail with reference to FIG. 3. The training video 201 input from the outside is input to the video reducing unit 203 and the high-frequency component extracting unit 204 in units of frame though the frame memory 202. The video reducing unit 203 reduces each frame of the input training video 201 to half vertically and horizontally, in the space direction by, for example, a bilinear method, to generate a reduced video 205.

The method of reducing the training video 201 which is executed with the video reducing unit 203 may be a method other than the bilinear method. It may be, for instance, a nearest neighbor method, a bicubic method, a cubic convolution method, a cubic spline method, an area-average method, and the like. Alternatively, the reduction of the training video 201 may be performed by blurring the training video 201 with a low-pass filter and then sampling it. The use of high-speed reduction method enables increasing the speed of resolution enhancing processing of the video. Using the high-quality reduction method provides the image resolution enhancing of high quality.

The image reducing unit 203 may reduce the input training video 201 not only in the space direction but also in the time direction. In this case, the video reducing unit 203 enables input video 301 of a fast-moving object to be resolution-enhanced with high quality without using the image in which the object moves quickly as the training video 201.

That is, the video reducing unit 203 generates the reduced video 205 by reducing the training video 201 to $1/\alpha$ ($\alpha \geq 1$) time in a vertical direction, to $1/\beta$ ($\beta \geq 1$) time in a horizontal direction, and to $1/\gamma$ ($\gamma \geq 1$) time in a time direction. Thus, the reduced video 205 generated from the video reducing unit 203 is input to the feature vector calculating unit 206.

The vector calculating unit 206 calculates first feature vectors 209 having as an element a feature amount of a first spatio-temporal box 401 in the reduced video 205, which is specified by a control unit (not shown). The spatio-temporal box includes a pixel set of, for example, T pixels (T frame) of the video in the time direction, Y pixels in the vertical direction and X pixels in the horizontal direction in the video. In this case, the shape of each spatio-temporal box becomes square, but another shape will be acceptable with a selection way of the pixel set changed.

The feature amount is, for instance, values of pixels in the first spatio-temporal box 401. Alternatively, the feature amount may be values of pixels in the spatio-temporal box at the same position as that of the first spatio-temporal box in the video composed of an image obtained by generating a reduced and magnified image in which each frame of the reduced video 205 is reduced, for example, vertically and horizontally to ½, respectively, then generated by two times, and obtained by subtracting the reduced and magnified image from an image of the corresponding original frame. The first featured vector 209 calculated with the vector calculating unit 206 is input to the storage unit 210.

The high-frequency component extracting unit 204 extracts high-frequency components in the input training video 201 to produce a high-frequency component video 211. More specifically, the extracting unit 204 generates the reduced and magnified image by reducing each frame of, for example, the training image 201 vertically and horizontally to ½ and then magnifying the reduced frame twice. Further, it extracts the high-frequency component by subtracting the reduced and magnified image from the image of the original frame. Alternatively, the high-frequency component may be extracted by applying a high-pass filter to each frame of the training video 201. The high-frequency component video 211 output from the extracting unit 204 is input to the high-frequency box generating unit 212.

The high-frequency box generating unit 212 extracts a second spatio-temporal box (high-frequency box) 213 at a position specified by the control unit (not shown) from the input high-frequency component video 211 and input it in the storage unit 210. The position of the second spatio-temporal box 213 specified by the control unit is the same as that of the first spatio-temporal box 401 in the reduced image 205. The same position means a part at which the same object is imaged. The second spatio-temporal box 213 and first spatio-temporal box 401 need not to be same in size with each other.

The storage unit 210 stores a pair of input first feature vector 209 and second spatio-temporal box 213 as elements of the look-up table. The resolution enhancing unit 300 performs resolution enhancement on the input video 301 by using the look-up table stored in the storage unit 210 by means of the training unit 200 in the above-described manner.

Figure 4:
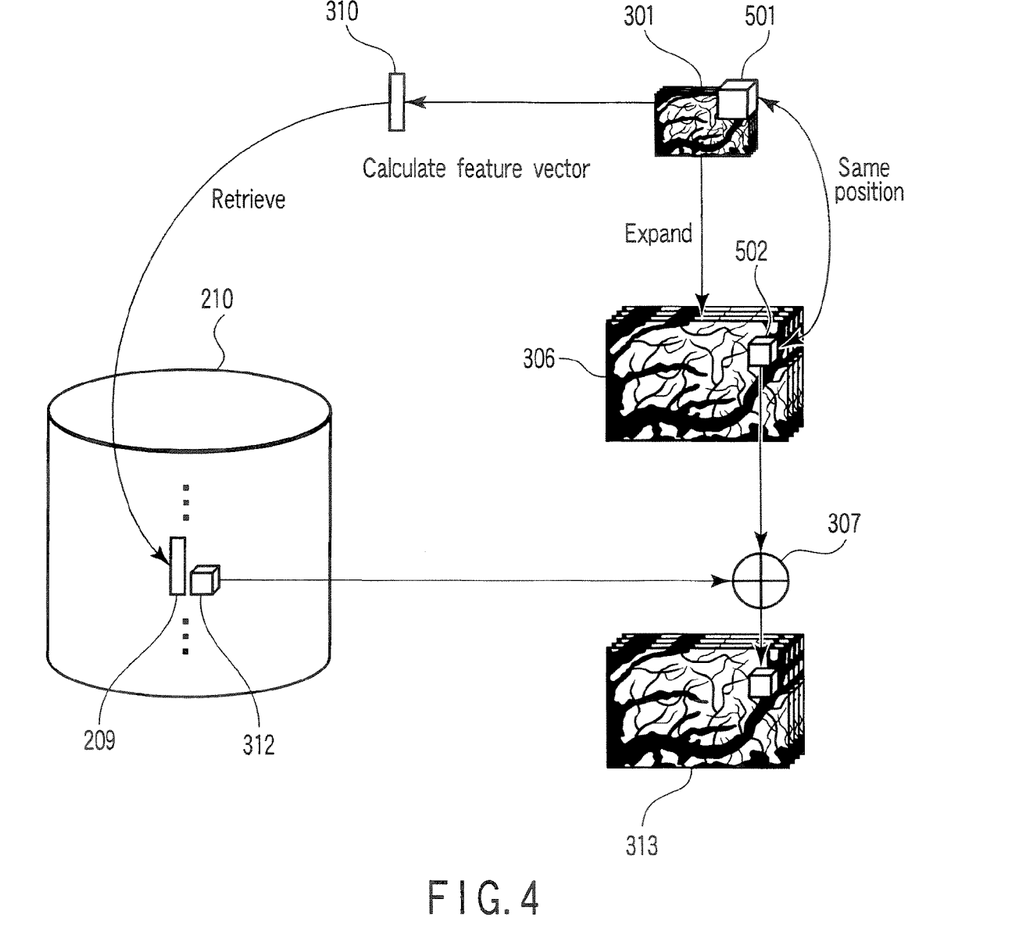
FIG. 4 is a schematic diagram for explaining processing of a resolution enhancing stage in the embodiment.

The resolution enhancing unit 300 in FIG. 2 will be described in detail with reference to FIG. 4. The resolution enhancing unit 300 receives the input video 301 from outside to output a resolution-enhanced output video 313. The input video 301 is input to the video magnifying unit 304 and the feature vector calculating unit 305 through the frame memory 302 in units of frame. The video magnifying unit 304 magnifies each frame of the input video 301 twice vertically and horizontally in the space direction, by, for example, a bilinear method to generate a temporary magnified video 306. The "temporary" of the temporary magnified video 306 means that it is a temporarily magnified image in a stage before the resolution-enhanced output image (magnified image) 313 is finally obtained by the video resolution enhancing apparatus.

The method for magnifying the input video 301 in the video magnifying unit 304 may be methods other than the bilinear method. For instance, interpolation methods such as the nearest neighbor method, bicubic method, cubic convolution method, cubic spline method are acceptable. The use of a high-speed interpolation method enables the speeding up of the image resolution enhancing processing. Using the interpolation method of high quality makes the image resolution enhancement itself high in quality.

In the case in which the video reducing unit 203 reduces the training video 201 not only in the space direction but also in the time direction, the video magnifying unit 304 magnifies the input video 301 also in the time direction. That is, the video magnifying unit 304 magnifies the input video 301 by an magnification ratio ($\alpha$ times ($\alpha \geq 1$) in vertical direction, $\beta$ times ($\beta \geq 1$) in horizontal direction, and $\gamma$ times ($\gamma \geq 1$)) in time direction of an inverse number of a reduction ratio ($1/\alpha$, $1/\beta$, and $1/\gamma$) to the training video 201 at the video reducing unit 203. Thus, the temporary magnified video 306 generated by the video magnifying unit 304 is input to an adding unit 307.

On the other hand, the feature vector calculating unit 305 calculates second feature vectors 310 having feature amounts of third spatio-temporal box 501 of the input video 301 specified by the not shown control unit to input it so as to refer the look-up table on the storage unit 210.

The third spatio-temporal box 501 is sequentially specified by the control unit so that the corresponding spatio-temporal box 501 covers the input video 301 and has the same size as that of the first spatio-temporal box 401 in the reduced video 205. The third spatio-temporal box 501 may be overlapped with one another. The feature amounts mean, for instance, the values of the pixels themselves in the third spatio-temporal box 501. Or, the feature amounts mean the values of the pixels in the spatio-temporal box at the same position as that of the third spatio-temporal box 501 in the video consisting of the images obtained by generating the reduced and magnified image doubled in the size after reducing each frame in the input videos 301 vertically and horizontally to ½, respectively, for example, in the bilinear method and subtracting the reduced and magnified image from the corresponding original frame. The calculation method of the feature amounts at the feature vector calculating unit 305 is preferable to be the same as that of the feature vector circulating unit 206 in the training unit 200 shown in FIG. 1.

The second feature vectors 310 calculated in such a manner refer to the look-up table stored in the storage unit 210. As a result, a vector most similar to the second feature vectors 310 is retrieved from among the first feature vectors 209 in the look-up table, and also a spatio-temporal box making pair with the retrieved feature vector among the second spatio-temporal box (high-frequency box) 213 in the look-up table are output as box for adding 312 and transmitted to the adding unit 307.

In this case, as for the vector most similar to the second feature vectors 310, the first feature vector that has a minimum distance from the relevant feature vector 310 is selected. As the distance between vectors to be used for retrieving from the look-up table, a L1 distance (Manhattan distance) is appropriately used; however, the distance is not limited to such distance, and an L2 distance (Euclidean distance), L∞distance, or distance weighted to the L1 distance, L2 distance or L∞distance, and other distances are acceptable.

Here, a high-frequency box (second spatio-temporal box) making a pair with the vector most similar to the second feature vector 310 retrieved from the look-up table having be set as the box for the adding 312, it is not always limited to such manner. For example, a high-frequency box (second spatio-temporal box) making a pair with a vector similar to a k-th ($k \geq 2$) may be set as the box for the adding 312. Retrieving a plurality of vectors similar to the second feature vector 310 from the look-up table and setting an average of the plurality of high-frequency boxes that is made pairs with the retrieved vectors as the boxes 312 for the adding is a possible approach. Weighting and averaging the plurality of high-frequency boxes in response to distances between the plurality of vectors may produce the boxes for the adding 312. When the distances between the vectors exceed a threshold, the resolution enhancing unit 300 may not produce the boxes for the adding 312 and not perform an addition to the below-mentioned temporary magnified video 306. Thereby, the enhancing unit 300 can suppress noise generated from the output video 313 when any vector similar to the second feature vectors 310 does not present in the look-up table.

An adding unit 307 adds the box for adding 312 to fourth spatio-temporal box 502 at the same position as that of the third box 501 in the temporary magnified video 306 specified by the not shown control unit to generate the output video 313. In this case, the same position means a part with the same object imaged thereat. The fourth spatio-temporal box 502 has the same size as that of the box for the adding 312; however, it is not required to be the same size as that of the third box 501. The fourth spatio-temporal boxes 502 may be overlapped with one another. If the fourth spatio-temporal boxes 502 are overlapped with one another, the adding unit 307 adds averaged values at the overlapped parts or adds box values treated later.

The adding unit 307 may not perform the addition of the boxes for adding at parts at which the objects move drastically (parts at which movements of objects relatively larger than other parts). Eyes of a human being having characteristics of sharp feeling of parts with quick movements, omitting the processing of the parts can reduce a calculation amount. Or, at the parts with drastic movements of the objects, the method in JP-A 2003-18398 (KOKAI) may be utilized, thereby, the parts with the drastic movements of the objects are observed in further sharpness sometimes.

Figure 5:
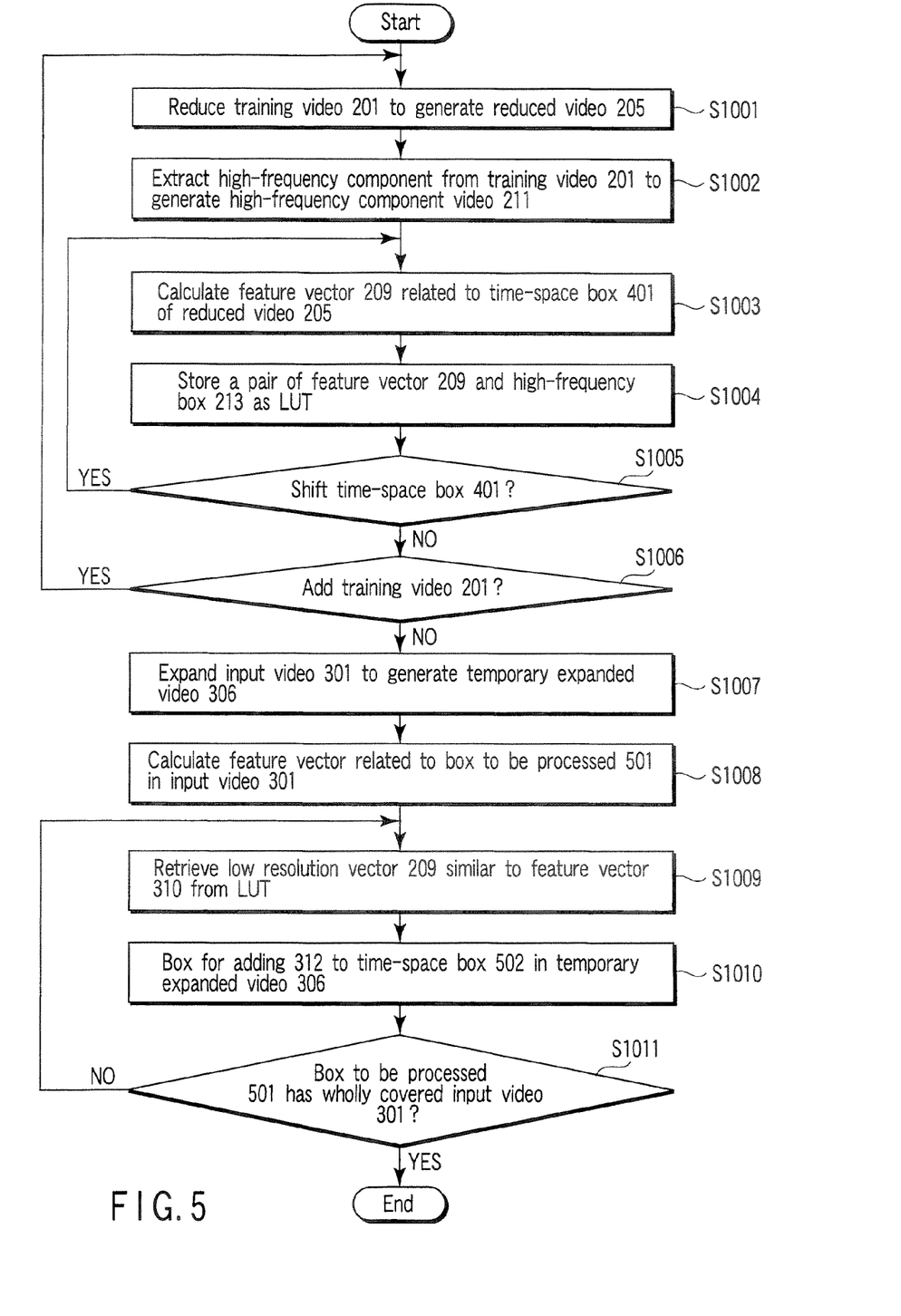
FIG. 5 is an exemplary flowchart for explaining a flow of resolution enhancing processing of a video in accordance with the embodiment.

Next to this, a flow of a resolution enhancing process of a video in the present embodiment will be described by referring to a flowchart shown in FIG. 5.

<Step S1001> The Resolution enhancing process reduces the training video 201, for instance, vertically and horizontally to ½, respectively, by the bilinear method to generate the reduced video 205. As mentioned above, the enhancing process may perform the reduction in vertical and horizontal directions, and the time direction.

<Step S1002> The enhancing process extracts the high-frequency components from each frame of the training video 201 to generate the high-frequency component video 211.

<Step S1003> The enhancing process calculates the first feature vector 209 having the feature amount, of the first spatio-temporal box 401 in the reduced video 205, as element.

<Step S1004> The enhancing process extracts the second spatio-temporal box (high-frequency box) 213 at the same position as that of the first spatio-temporal box 401 obtained in step S1003 from the high-frequency component video 211 to store the pair, of the first feature vector 209 and the high-frequency box 213, as element of the look-up table (referred to as LUT in FIG. 5) in the storage unit 210.

<Step S1005> The enhancing process shifts the position of the first spatio-temporal box 401 in the reduced video and the process returns to step S1003 or advances to step S1006. It is determined whether the process returns to step S1003 or advances to step S1006, for instance, on the basis of the capacity of the look-up table to be stored, or determined whether all first spatio-temporal boxes in the training video are processed or not.

<Step S1006> The enhancing process returns to step S1001 in the case of adding the training video, and advances to step S1007 in the case of no adding it.

<Step s1007> The enhancing process magnifies the input video 301 vertically and horizontally twice, respectively, to generate the temporary magnified video 306. In reducing the input video 301 in the vertical and horizontal directions and the time direction in step S1001, the process also magnifies it in the vertical and horizontal directions and the time direction.

<Step S1008> The enhancing process calculates the second feature vector 310 having the feature amount, of the third spatio-temporal box 501 to be processed in the input video 301, as the element.

<Step S1009> The enhancing process retrieves one feature vector most similar to the second feature vector 310 or a plurality of feature vectors similar to the second feature vector 310 among the first feature vectors 209 in the look-up table stored in the storage unit 210.

<Step S1010> The second spatio-temporal box (high-frequency box) 213 making the pair with the feature vector retrieved in step S1009 are regarded as the box for the adding 312. The process adds the box 312 to the fourth spatio-temporal box 502 in the temporary magnified video 306 at the same position as that of the third spatio-temporal box 501 to be processed.

<Step S1011> When the third spatio-temporal boxes 501 wholly cover the input video 301, the enhancing process outputs the additional result between the temporary magnified images 306 and all boxes 312 as the resolution-enhanced output video 313 then ends the process. If the third spatio-temporal boxes 501 do not wholly cover the input video 301, the process shifts the position of the third spatio-temporal box 501, then, returns to step S1009.

Figure 6:
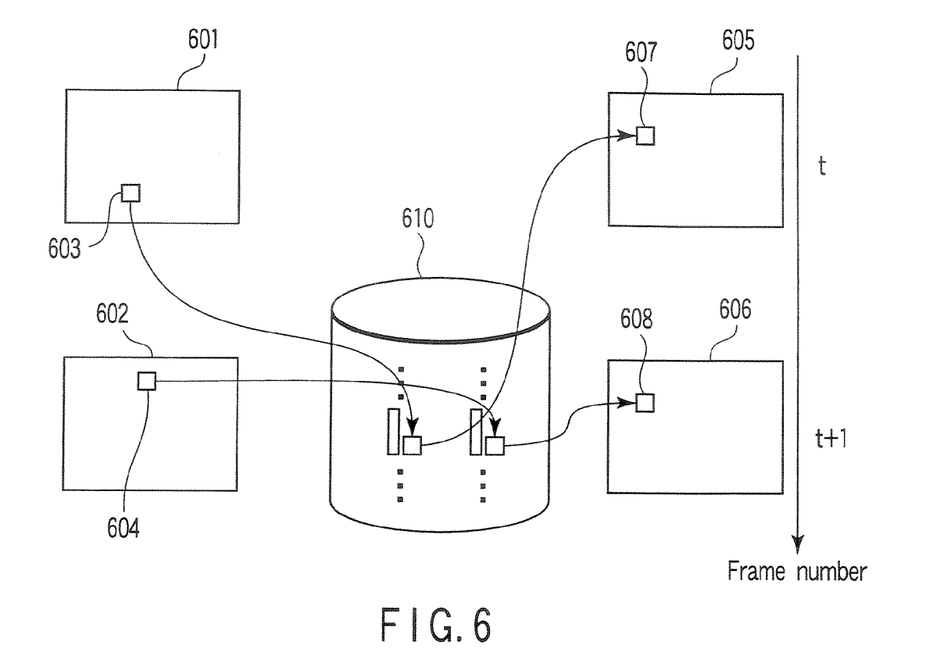
FIG. 6 is an exemplary schematic diagram for explaining a problem of a comparative example.

The resolution enhancement of the video in accordance with the method of one embodiment of the present invention can suppress flickering generated from the method disclosed by JP-A 2003-18398 (KOKAI). The effect will be explained with reference to FIG. 6 and FIG. 7. FIG. 6 shows an aspect of the resolution enhancement of the video depending on such a conventional method described in JP-A 2003-18398 (KOKAI). An output block 607 in an output image 605 in which the t-th frame of the input video is resolution-enhanced and an output block 608 of a second output image 606 in which a (t+1)-th frame of the input video thereof are placed at the same position in the space direction. However, in the training stage, the output blocks 607 and 608 are high-frequency blocks 603 and 604 in different two high-frequency component images 601 and 602, and they are generated from specially and absolutely different positions. The two high-frequency blocks 603 and 604 each have high-frequency components, not successively in the time direction, as elements. Accordingly, reproducing the output images 605 and 606 including the output blocks 607 and 608 obtained by each adding the high-frequency blocks 603 and 604 to temporary magnified blocks, respectively, causes unnatural time changes.

Figure 7:
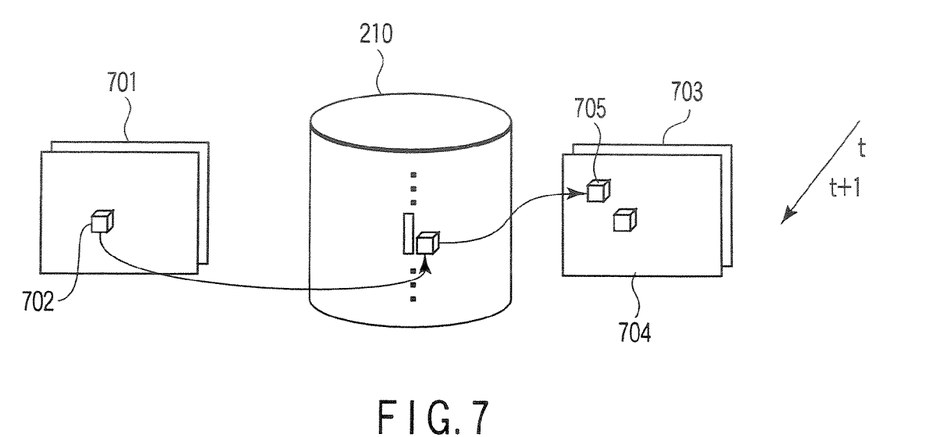
FIG. 7 is an exemplary schematic diagram for explaining an effect by the embodiment.

On the other hand, FIG. 7 illustrates an aspect to resolution-enhance the video in accordance with one embodiment of the present invention. Cross sections of the spatio-temporal box 703 at a t-th frame and a (t+1)-th frame of the output video in which the input video is resolution-enhanced are present at the same position in the space direction. In the training stage, the cross sections of the spatio-temporal box 703 at the t-th frame and at the (t+1)-th frame are the spatio-temporal box 703 of the high-frequency component images 701 and 702, respectively, and they are successive in the time direction, and are generated from the same position in the space direction. Therefore, high-frequency components not successive in the time direction are not added and unnatural time changes are not caused in the time direction, so that the flickering can be restricted.

The present invention is not limited to the aforementioned embodiments as they are. This invention may be embodied in various forms without departing from the spirit or scope of the general inventive concept thereof. Various types of the invention can be formed by appropriately combining a plurality of constituent elements and some of the element may be omitted form the whole of the constituent elements.

For example, the pairs, of the first feature vectors and the second spatio-temporal boxes to be stored as the elements of the look-up table, may be padded as follows.

(1) A plurality of training videos are generated by sifting one training video in at least one direction of a vertical direction and a horizontal direction for each frame, or by reducing the training video in one direction of the vertical direction, the horizontal direction, or the time direction. The plurality of training videos are transferred to the video reducing unit 203 in FIG. 1 or step S1001 in FIG. 5. Thereby, many pairs of the first feature vectors and the second spatio-temporal boxes can being generated without having to collect a lot of training videos in which the objects moves variedly, the resolution enhancement with further high quality can be accomplished. The pairs of the first feature vectors and the second spatio-temporal boxes also can be padded by the following methods without having to actually generate any new training video.

(2) It is possible for the input training videos to utilize them after reversing in the time direction without utilizing them as they are. Thereby, the pairs of the first feature vectors and the second spatio-temporal boxes 213 suitable for the objects moving inversely to the input training videos are stored as elements of the look-up table. Using both the input original training videos and the training videos reversed in the time direction, two of pairs can be stored in the look-up table from one video.

(3) A plurality of first spatio-temporal boxes are generated by shifting the positions of the cross sections at each time of one first spatio-temporal box 401 in at least one direction of the vertical direction and horizontal direction, or by reducing the one first spatio-temporal box 401 in at least one direction of the vertical direction, horizontal direction or time direction. The plurality of first spatio-temporal boxes are transferred to the feature vector calculating unit 206 in FIG. 1, or to step S1003 in FIG. 5.

(4) A plurality of third spatio-temporal boxes are generated by shifting the positions of the cross sections at each time of one of the third spatio-temporal boxes (high-frequency boxes) 213. The plurality of third spatio-temporal boxes are transferred to the storage unit 210 in FIG. 1 or the retrieval step S1006 in FIG. 5.

On the other hand, other than padding the pairs of the first feature vectors and the second spatio-temporal boxes, below-mentioned methods may be used. Dividing each element of the first feature vectors 209 and the second spatio-temporal boxes 213 by the value to which decimal numbers are added to norms of the second feature vectors 310 to store them, setting the vectors in which the decimal numbers are added to the norms of the second feature vectors 310 as the vectors 310 to retrieve the vectors similar to the vectors 310, and multiplying the boxes for adding 312 by the values to which the decimal numbers are added to the norms of the vectors 310 to add them to the temporary magnified videos 306 is a possible change.

Or, the following method is a possible approach, that is, the first feature vectors 209 are made as normalized vectors so that the average and diffusion of each element becomes "0" and "1", respectively, then, the pair of the vectors and the second spatio-temporal boxes 213 are stored. It is also considerable that the second vectors 310 are normalized so that the average and diffusion of each element becomes "0" and "1", respectively, then, retrieves the first feature vectors 209 similar to the second feature vectors from the look up table 210.

Thereby, even if the look-up table 210 stores a few number of the pairs of the first feature vectors and the second spatio-temporal boxes 209, the resolution-enhanced image with high quality can be obtained.

In retrieving from the look-up table 210, boxes, in which the positions of blocks as the cross-sections at each time of the third spatio-temporal boxes 501 that are objects to be processed by the input video 301 are shifted in the vertical direction or the horizontal direction, may be set as new third spatio-temporal boxes 501. Thereby, even if the pairs of the first feature vectors and the second spatio-temporal boxes generated from the training video in which the object moved variedly are not stored in the look-up table, the resolution enhancing with high quality can be achieved.

The above-mentioned description having described as if the input video 301 is another image in comparison to the training video 201, the input video 301 may be utilized as the training video 201. Therefore, the resolution enhancing apparatus can omit the time and labor to collect the type of training video, such as a face, a building and a plant similar to the input video.

Further, generating the reduced video by reducing the input video to ½ time in the vertical direction and the horizontal direction and generating the temporary magnified video by magnifying to 2 times in the vertical direction, horizontal direction and time direction are possible approach. Thereby, the resolution enhancing apparatus and method can be achieved without having to collect the training videos in which the objects move like the input videos.

What is claimed is:
1. A method of enhancing resolution of video, comprising:
reducing at least one training video having a high-frequency component by a specified reduction ratio in at least one direction of a vertical direction and a horizontal direction to generate a reduced video having at least one first spatio-temporal box;
extracting the high-frequency component from the training video to generate a high-frequency component video having at least one second spatio-temporal box;
calculating at least one first feature vector including a feature amount of the first spatio-temporal box of the reduced video;
storing, in a look-up table, a plurality of pairs each having the first feature vector and the second spatio-temporal box at a position equivalent to that of the first spatio-temporal box;
magnifying an input video including a third spatio-temporal box by an magnification ratio of an inverse number of the reduction ratio in at least one direction of the vertical direction and the horizontal direction to generate a temporary magnified video having a fourth spatio-temporal box;
retrieving, a first feature vector similar to a second feature vector including a feature amount of the third spatio-temporal box of the input video, as an element, from the look-up table; and
adding the second spatio-temporal box stored in the look-up table, corresponding to the retrieved first feature vector, to the fourth spatio-temporal box at the same position as that of the third spatio-temporal box to generate an resolution-enhanced video.

2. The method according to claim 1, wherein
the reducing further reduces the training video in a time direction; and
the magnifying further magnifies the input video in the time direction.

3. The method according to claim 1, further comprising:
generating a plurality of training videos by shifting one training video in at least one direction of the vertical direction and the horizontal direction for each frame, or reducing the one training video in at least one direction of the vertical direction, the horizontal direction or a time direction, wherein the plurality of training videos are transferred to the reducing.

4. The method according to claim 1, further comprising:
generating a plurality of first spatio-temporal boxes by shifting positions of cross sections at each time of one first spatio-temporal box in at least one direction of the vertical direction and the horizontal direction, or reducing the one first spatio-temporal box in at least one direction of the vertical direction, the horizontal direction or a time direction, wherein the plurality of first spatio-temporal boxes are transferred to the calculating.

5. The method according to claim 1, further comprising:
generating a plurality of third spatio-temporal boxes by shifting positions of cross sections at each time of one third spatio-temporal box in at least one direction of a vertical direction and a horizontal direction, wherein the plurality of third spatio-temporal boxes are transferred to the retrieving.

6. The method according to claim 1, wherein when the fourth spatio-temporal blocks are overlapped with one another, the adding adds, an averaged value of a plurality of second spatio-temporal boxes corresponding to the overlapped parts of the fourth spatio-temporal blocks, or a value of a second spatio-temporal box to be added at last among the plurality of second spatio-temporal boxes, to the overlapped parts.

7. The method according to claim 1, wherein the adding performs the adding except parts at which movements of objects are relatively large.

8. The method according to claim 1, wherein the input video is used as the training video.

9. An apparatus of enhancing resolution of video, comprising:
a reducing unit configured to reduce at least one training video having a high-frequency component by a specified reduction ratio in at least one direction of a vertical direction and a horizontal direction to generate a reduced video having at least one first spatio-temporal box;
an extracting unit configured to extract the high-frequency component from the training video to generate a high-frequency component video having at least one second spatio-temporal box;
a calculating unit configured to calculate at least one first feature vector including a feature amount of the first spatio-temporal box of the reduced video;
a storing unit configured to store as a look-up table, a plurality of pairs each having the first feature vector and the second spatio-temporal box at a position equivalent to that of the first spatio-temporal box;
a magnifying unit configured to magnify an input video including a third spatio-temporal box by an magnification ratio of an inverse number of the reduction ratio in at least one direction of the vertical direction and the horizontal direction to generate a temporary magnified video having a fourth spatio-temporal box;
a retrieving unit configured to retrieve a first feature vector similar to a second feature vector including a feature amount of the third spatio-temporal box of the input video, as an element, from the look-up table; and
an adding unit configured to add the second spatio-temporal box stored in the look-up table, corresponding to the retrieved first feature vector, to the fourth spatio-temporal box at the same position as that of the third spatio-temporal box to generate an resolution-enhanced video.

10. The apparatus according to claim 9, wherein
the reducing unit is configured to further reduce the training video in a time direction; and
the magnifying unit is configured to further magnify the input video in the time direction.

11. The apparatus according to claim 9, further comprising:
a generating unit configured to generate a plurality of training videos by shifting one training video in at least one direction of the vertical direction and the horizontal direction for each frame, or reducing the one training video in at least one direction of the vertical direction, the horizontal direction or a time direction, wherein the plurality of training videos are transferred to the reducing unit.

12. The apparatus according to claim 9, further comprising:
a generating unit configured to generate a plurality of first spatio-temporal boxes by shifting positions of cross sections at each time of one first spatio-temporal box in at least one direction of the vertical direction and the horizontal direction, or reducing the one first spatio-temporal box in at least one direction of the vertical direction, the horizontal direction or a time direction, wherein the plurality of first spatio-temporal boxes are transferred to the calculating unit.

13. The apparatus according to claim 9, further comprising:
a generating unit configured to generate a plurality of third spatio-temporal boxes by shifting positions of cross sections at each time of one third spatio-temporal box in at least one direction of a vertical direction and a horizontal direction, wherein the plurality of third spatio-temporal boxes are transferred to the retrieving unit.

14. The apparatus according to claim 9, wherein when the fourth spatio-temporal blocks are overlapped with one another, the adding unit is configured to add an averaged value of a plurality of second spatio-temporal boxes corresponding to the overlapped parts of the fourth spatio-temporal blocks, or a value of a second spatio-temporal box to be added at last among the plurality of second spatio-temporal boxes, to the overlapped parts.

15. The apparatus according to claim 9, wherein the adding unit is configured to perform the adding except parts at which movements of objects are relatively large.

16. The apparatus according to claim 9, wherein the input video is used as the training video.

17. A computer readable storage medium storing instructions of a computer program which when executed by a computer results in performance of steps comprising:
performing function reducing at least one training video having a high-frequency component by a specified reduction ratio in at least one direction of a vertical direction and a horizontal direction to generate a reduced video having at least one first spatio-temporal box;
performing function extracting the high-frequency component from the training video to generate a high-frequency component video having at least one second spatio-temporal box;
performing function calculating at least one first feature vector including a feature amount of the first spatio-temporal box of the reduced video;
performing function storing, in a look-up table, a plurality of pairs each having the first feature vector and the second spatio-temporal box at a position equivalent to that of the first spatio-temporal box;
performing function magnifying an input video including a third spatio-temporal box by an magnification ratio of an inverse number of the reduction ratio in at least one direction of the vertical direction and the horizontal direction to generate a temporary magnified video having a fourth spatio-temporal box;
performing function retrieving, a first feature vector similar to a second feature vector including a feature amount of the third spatio-temporal box of the input video, as an element, from the look-up table; and
performing function adding the second spatio-temporal box stored in the look-up table, corresponding to the retrieved first feature vector, to the fourth spatio-temporal box at the same position as that of the third spatio-temporal box to generate an resolution-enhanced video.

* * * * *